Figure 3:
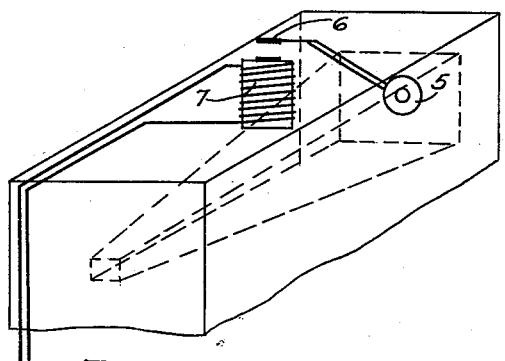

Oct. 31, 1961  F. SMOLAŘ  3,006,239

SPEED CONTROL AND SIGNAL IN MOTION PICTURE CAMERA

Filed Sept. 5, 1957

INVENTOR.
František Smolař
BY Richard Low

United States Patent Office 3,006,239
Patented Oct. 31, 1961

3,006,239
SPEED CONTROL AND SIGNAL IN
MOTION PICTURE CAMERA
František Smolař, Modrany, Czechoslovakia, assignor to
Meopta, narodni podnik, Modrany, Czechoslovakia
Filed Sept. 5, 1957, Ser. No. 682,101
3 Claims. (Cl. 88—16)

The present invention has for its object to provide a device on motion picture cameras to be electrically driven from a suitable electric source, such as, flash light cells or storage batteries, and intended to signal the proper operation of the camera.

In motion picture cameras electrically driven by photoelectric cells or storage batteries, proper operation of the camera requires the maintenance of an adequate voltage of the electric current which is not to decrease below a pre-determined value, and is also dependent upon the mechanical condition of the apparatus. The maintenance of proper voltage and mechanical condition requires frequent check-ups of the voltage or frame frequency, thereby impeding fluency of picture taking. Moreover, the moment a drop of voltage occurs and therefore a decrease in the rotational speed or frame frequency is hardly noticeable during the film taking operation, and results in loss of material and waste of time.

Signalling devices presently provided on motion picture cameras enable the operator to check: that the camera lens is focussed on a certain distance; that a certain length of film has been wound off; that there is no film in the camera; that the leader is at its end; that the film is nearing its end portion; that the end of the film has been reached; and that the opening of the diaphragm corresponds to the light conditions prevailing.

The object of the present invention is to provide a signalling device indicating the proper operation of the camera, that is, the maintenance of the frame frequency within desired limits.

A camera according to the present invention is provided with a device making possible the permanent checking of the proper running of the apparatus and signalling immediately any drop of the voltage of the electric current for the electric motor of the apparatus under the minimum value required for proper operation, or, if owing to a mechanical defect, the available voltage is inadequate for maintaining a proper frame frequency. For the above purpose, the camera is provided with a signalling indicator of proper operation placed, for example, inside the channel of the view finder outside the image field.

In motion picture cameras driven by a small electric motor whose rotational speed is maintained constant by a contact governor, the contacts of the latter are, as a rule, bridged over or shunted by a regulating resistance, mainly for the purpose of preventing sparking.

According to the present invention, this regulating resistance is replaced by the resistance of a bulb or of an electro-magnet of the signalling device.

The invention will be described more fully in the following specification with reference to the accompanying drawings illustrating by way of example an embodiment of the present invention.

Figure 1:
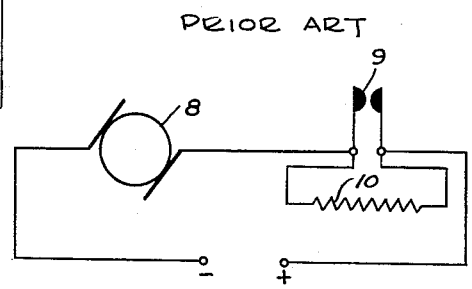
Figure 2:
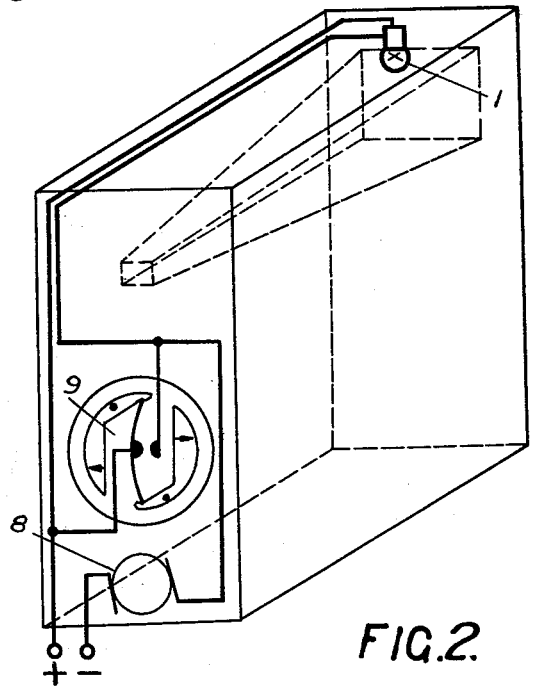

FIG. 1 is a wiring diagram of the electric drive motor of a motion picture camera with a contact governor having its contacts shunted by a regulating resistance, as is well known in the prior art;

FIG. 2 diagrammatically illustrates a camera whose electric motor and contact governor are connected in the same manner as shown in FIG. 1, but with the regulating resistance replaced by the resistance of an incandescent bulb, which forms a signalling device;

FIG. 3 is a fragmentary diagrammatic view of a modification of the device of FIG. 2 wherein, according to the invention, an electromagnet with an appropriated signalling means forms the signalling device.

Referring now to the drawing, FIG. 1 shows the wiring diagram of a motion picture camera driven by a small electric motor 8 which is controlled in a known manner by a contact governor of the kind disclosed in my U.S. Patent 2,872,177, issued on February 3, 1959. The governor actuates a pair of contacts 9 which are shunted by a regulating resistance 10 connected in parallel with the contacts 9, mainly for the purpose of preventing sparking on opening and closing of the contacts which regulate the rotational speed of the driving electric motor 8. When the motor 8 is switched on, the contacts 9 at first remain closed. When the rotational speed of the electric motor 8 reaches the required value, the governor opens the contacts 9, and the current supply to the motor 8 is then limited by the resistance 10. Opening of the contacts 9 causes the rotational speed of the electric motor 8 to decrease so that the governor again closes the pair of contacts 9. This cycle is repeated within very short intervals whereby the rotational speed of the motor, and of the camera drive, is maintained at the required constant value.

As shown in FIG. 2, the regulating resistance 10 of the conventional circuit of FIG. 1 is replaced according to the present invention by the resistance of an incandescent bulb 1 of a signalling device. The bulb 1 is placed within a cell or casing (not shown) provided with a colored window through which, during picture taking, the dimmed light of the bulb may pass into the viewfinder of the camera and thus into the field of vision of the photographer. As long as the desired rotational speed of the camera is maintained, the bulb 1 is energized and utilizes the current which would be uselessly absorbed by the regulating resistance 10 of the apparatus shown in FIG. 1 as long as the required rotational speed of the electric motor 8 is being maintained, that is, during the period when the contacts 9 remain open. The repeated cycles of opening and re-closing the contacts 9 do not result in flickering of the bulb 1 which is extinguished only when the rotational speed of the electric motor 8 decreases permanently below the required value, so that the switch constituted by the pair of contacts 9 remains permanently closed. The contacts 9 then provide a path of negligible resistance for the current bypassing the bulb 1 which is connected in parallel. If the voltage of the flashlight cell or of the storage battery which is the source of current for the motor 8 drops below the value required, or if the voltage becomes inadequate to overcome an increase of mechanical resistance in the camera and to maintain the desired rotational speed, the contacts 9 are closed and the bulb 1 is extinguished. This is immediately noticed by the photographer who stops filming to change the battery or to correct the defect which causes an inadequate rotational speed.

If the signalling indicator is visible outside the camera, it can serve for checking by a person other than the photographer, or for indicating that the camera is running.

The signalling bulb 1 of the apparatus illustrated in FIG. 2 may be replaced by an electromagnet provided with signalling means as shown in FIG. 3. The signalling means is constituted by a flag 5 mounted on an arm 6 which is controlled by an electromagnet 7 connected in the electric circuit in the same manner as the bulb 1 of FIG. 2. The proper operation of the camera is indicated when the flag 5 is deflected outside the field of the view finder by the arm 6 being attracted towards the electromagnet 7. If the rotational speed of the camera motor decreases below a predetermined value, the electric circuit of the magnet is short-circuited whereupon the arm 6 falls off, and the signalling flag 5 is observed in the view finder.

The chief advantage of this arrangement according to the present invention resides in the fact that by its use a permanent control of the operation of the camera is made possible and thereby also a permanent check-up of the voltage of the current source as well as its full utilization. A further advantage of the present invention consists in that the signalling means can be included in the electric circuit, as in FIG. 4, instead of the regulating resistance of the conventional circuit of FIG. 3, thus replacing the latter.

It is to be understood that the invention is not limited to the specific embodiments described in detail herein and can be modified in constructional details without departing from the scope of the invention as defined in the appended claims.

What I claim is:

1. In a motion picture camera having a housing, a view-finder, and an electric drive supplied with current from a source thereof, the combination of a centrifugally controlled contact governor connected with the drive of the camera, and a device for checking the maintenance of the frame frequency within a selected range, said device including a signalling means indicating whether the frame frequency is maintained within said selected range by producing visible signals in the field of view of said view-finder, said signalling means being connected to the source of current in parallel with the contacts of said governor, said signalling means being arranged inside the camera housing but outside the image field of said view-finder, the electric connection of said signalling means to said source being controlled by said contacts of said governor while said signalling means also functions as a regulating resistance for said governor.

2. In a motion picture camera, the combination as in claim 1; wherein said signalling means is in the form of an incandescent lamp operative to project a beam of light into the field of view of said view-finder.

3. In a motion picture camera, the combination as in claim 2; wherein said device further includes a casing around said lamp and having a colored window through which said beam of light is emitted from the casing.

References Cited in the file of this patent

UNITED STATES PATENTS

| | | |
|---|---|---|
| 1,291,276 | Uebelmesser | Jan. 14, 1919 |
| 1,683,314 | Stinchfield | Sept. 4, 1928 |
| 2,347,784 | La Rocca | May 2, 1944 |
| 2,441,185 | Brown et al. | May 11, 1948 |
| 2,462,655 | McHenry | Feb. 22, 1949 |
| 2,971,432 | Blank | Feb. 14, 1961 |

FOREIGN PATENTS

| | | |
|---|---|---|
| 441,996 | Great Britain | Jan. 30, 1936 |
| 740,877 | Great Britain | Nov. 23, 1955 |
| 728,205 | Germany | Nov. 23, 1942 |